Oct. 27, 1959     R. T. MARETTE ET AL     2,910,305
PNEUMATIC SUSPENSION FOR VEHICLES AND CONTROL VALVE THEREFOR
Filed April 15, 1957     2 Sheets-Sheet 1
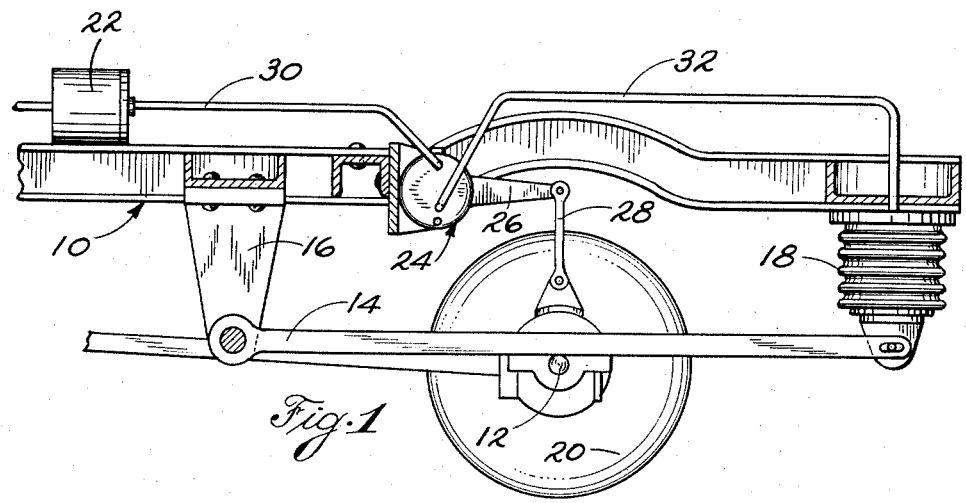
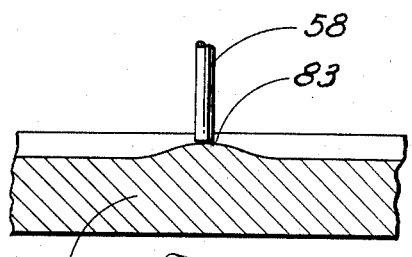
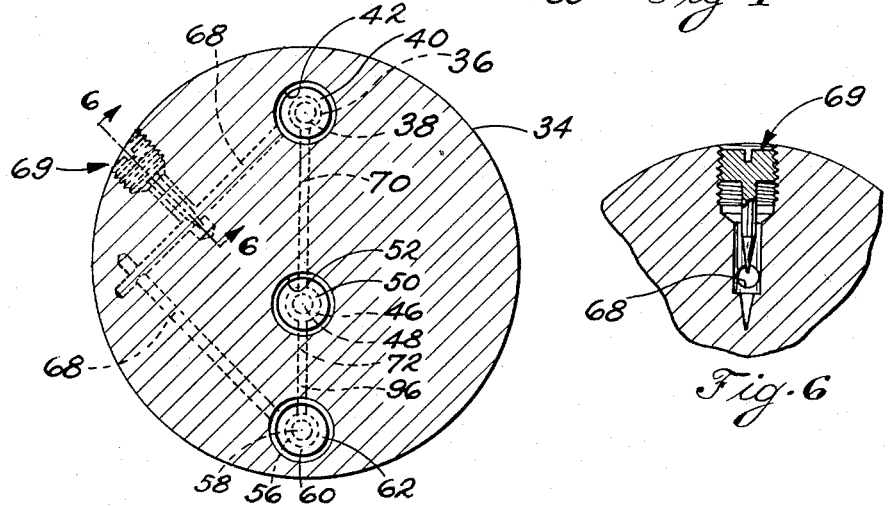
INVENTORS
RALPH T. MARETTE
& PAUL J. MILLER.
BY
RICHEY, WATTS, EDGERTON,
McNENNY & FARRINGTON.
ATTORNEYS

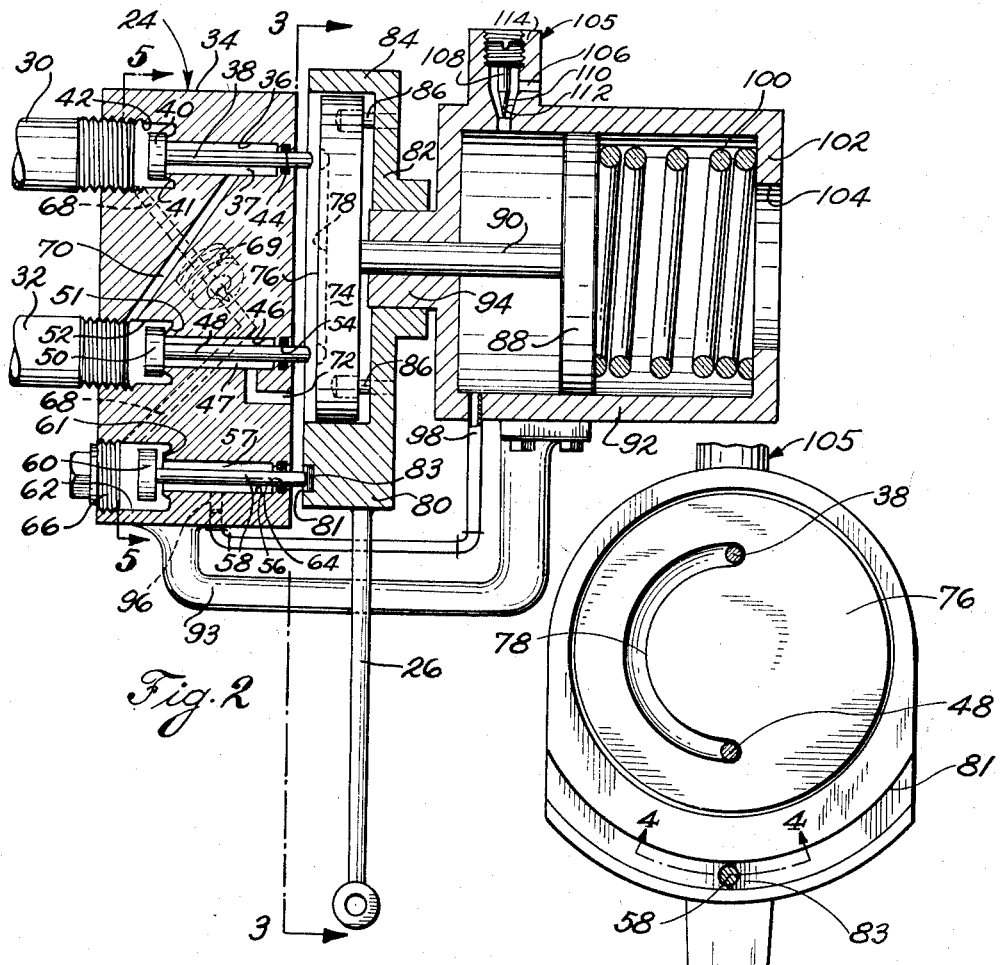
Fig. 2
Fig. 3
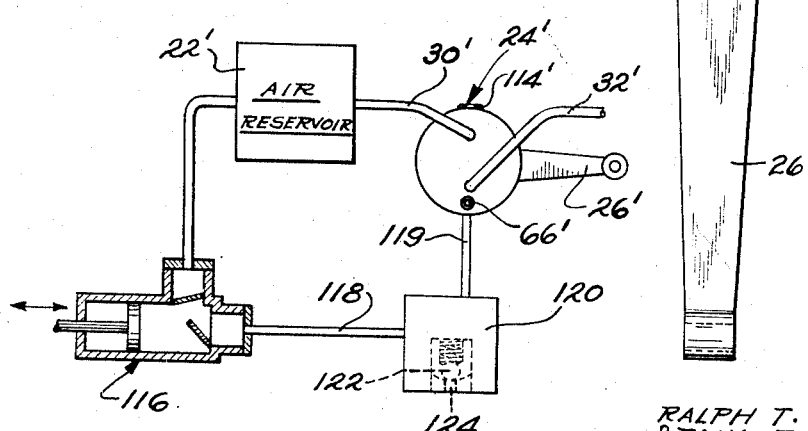
Fig. 7
INVENTORS
RALPH T. MARETTE
& PAUL J. MILLER
BY
RICHEY, WATTS, EDGERTON,
McNENNY & FARRINGTON.
Donald W. Farrington
ATTORNEYS

United States Patent Office 2,910,305
Patented Oct. 27, 1959

2,910,305

PNEUMATIC SUSPENSION FOR VEHICLES AND CONTROL VALVE THEREFOR

Ralph Thomas Marette, Cleveland Heights, and Paul John Miller, Maple Heights, Ohio, assignors to The Weatherhead Company, Cleveland, Ohio, a corporation of Ohio Application April 15, 1957, Serial No. 652,972

6 Claims. (Cl. 280—124)

This invention relates to an automatic control for vehicle suspension systems and more particularly to a valve apparatus including a time delay device operable in an automatic controlling system for regulating the effective working range of a vehicle suspension system in accordance with the vehicle load.

Broadly, this invention comprehends the provision of a valve apparatus for controlling air flow to or from an air spring in a vehicle suspension system maintaining a constant average spacing between vehicle frame and axle irrespective of vehicle load wherein flow of air to or from the spring is prevented during sudden and momentary differentials in spacing between frame and axle of the vehicle. A control system including a cam pivotal for selectively driving push rods to operate air valves controlling flow from the air spring to either the air source or ambient space is provided and as a feature, means for retracting the cam from engagement with the pusher rods during sudden and momentary pivotal movement of the cam is provided.

In the past, various control systems have been provided for regulating the flow of air to an air spring disposed between a vehicle frame and axle. Many such systems have been effective to maintain a substantially constant average spacing between axle and frame but have been somewhat deficient in failing to include means for preventing operation of the control valves of the system in response to sudden and momentary increases or decreases in such spacing as may result from the vehicle's passing over surface irregularities in various thoroughfares. As a consequence various apparatus has been devised to overcome this mentioned defect. Typical of such apparatus are dash-pot systems adaptable to influence the movement of control valve actuating arms. While such apparatus are in large measure adaptable to accomplish their purpose, the same are objectionable in that they provide time delay in all positions of an actuating arm including center or initial position and further are affected by temperature and consequently viscosity of dash-pot fluid.

According to the present invention, a time delay is provided during initial periods of movement of the valve controlling arm so as to prevent admission of air to or discharge of air from the air spring in response to momentary differential spacings between the vehicle frame and axle. The system is effective after sufficient time delay to admit air to or discharge it from the air spring in response to differential spacing between vehicle axle and frame. Such differential spacing may occur in response to increase or decrease in vehicle loading wherein the control valve arm is maintained at an average position facilitating a corrective influence on the air spring to return the level of frame with respect to axle to its initial position.

Accordingly, it is an object of this invention to provide a controlling valve for a vehicle air spring that is simple, efficient and effective to maintain a constant average spacing between vehicle frame and axle and that provides corrective air flow to or from the air spring only in response to prolonged spacing differentials between vehicle frame and axle.

It is another object of this invention to provide a vehicle air spring controlling apparatus including a pair of control valves actuable by a cam plate and having novel clutch apparatus for maintaining the cam plate declutched from the control valves in the absence of prolonged deviation of the cam plate from a predetermined initial position.

It is another object of the invention to provide a vehicle air spring controlling valve having a piston slidable in a cylinder under the influence of air under pressure selectively retracting and extending a valve engaging cam plate in accordance with the relative position of the vehicle frame with respect to the axle.

It is another object of the invention to provide a vehicle air spring controlling valve having a cylinder for accommodating a cam plate retracting piston and further having an air inlet for admitting air into the cylinder and an air vent smaller than the inlet for bleeding air admitted into the cylinder.

Other and further objects and advantages of this invention will appear from a detailed description of the invention taken with the accompanying drawings in which:

Fig. 1 illustrates in fragmentary cross-section a vehicle to which the present invention is applied;

Fig. 2 illustrates in cross-section the valve apparatus of the present invention;

Fig. 3 illustrates in a sectional side view taken along section 3—3 of Figure 2, the cam plate and actuating arm of the present invention;

Fig. 4 illustrates a sectional view taken along section 4—4 of Fig. 3 of a cammed housing employed in the present invention;

Fig. 5 illustrates a sectional view of the body of a valve taken along section 5—5 of Fig. 2;

Fig. 6 illustrates in detail a needle valve for controlling flow in a channel of this invention; and Fig. 7 illustrates another embodiment having a closed system for the air used therein.

Referring now more particularly to Fig. 1 of the drawings 10 represents a vehicle frame supported above the vehicle axle 12 by a cross bar 14 pivotally secured at one end to a bracket 16 and pivotally secured to a lower portion of an air spring 18 at the other end. Bracket 16 and spring 18 are secured to frame 10 at the ends remote from their connections to cross bar 14. Axle 12 is supported between a pair of wheels, one of which is shown at 20.

An air supply chamber 22 is mounted on frame 10 at a suitable location for supplying air to air spring 18 under control of a valve 24 which is also mounted on frame 10 and movable therewith. A valve actuating arm 26 extends from the valve body to a linking arm 28 pivotally secured at respective ends to the end of arm 26 and axle 12. A conduit 30 communicates between air supply chamber 22 and inlet of valve 24 and a conduit 32 communicates between the outlet of valve 24 and the interior of spring 18 which may be a bellows of a type well known.

Frame 10 is supported above axle 12 by the compressed air in spring 18 and in a vehicle of uniform load the static level of frame 10 above axle 12 varies according to the air pressure in spring 18. Similarly, for uniform air pressure in spring 18, the level of frame 10 varies according to the load in the vehicle supported by frame 10. To maintain an even level of frame 10 with respect to axle 12, the air pressure in spring 18 is varied under the control of valve 24. Decreased spacing between frame 10 and axle 12 is effective through actuation of arm 26 to admit air into spring 18 from supply chamber 22 through valve 24 and increased spacing between frame 10 and axle 12 is effective through actuation of arm 26 to vent air spring 18 to atmosphere through valve 24 in a manner explained hereinbelow.

According to a feature of the invention, the actuation of arm 26 is effective to control air flow to or from the air spring 18 only after a predetermined time delay after arm 26 is displaced so as to prevent such flow in response to only momentary displacement of arm 26.

Referring now to Fig. 2 of the drawings, air is introduced to or exhausted from the air spring through the main valve body or housing of valve 24. Air is conducted to a bore of opening 36 in the housing 34 through line 30 communicating with air source 22. Opening 36, receives a poppet 38 for controlling air flow from source 22 having an enlarged head 40 received in an enlargement 42 of opening 36. A reduced portion 44 of opening 36, provided with a suitable O ring, receives a stem portion of poppet 38. A second longitudinal opening 46 is provided in housing 34 for receiving a poppet 48 for controlling air flow from spring 18 and having an enlarged head 50 received in an enlargement 52 of opening 46. A reduced portion 54 of opening 46, provided with a suitable O ring, receives a stem portion of poppet 48 remote from its head 50. A third longitudinal opening 56 is provided in housing 34 for receiving a poppet 58 having an enlarged head 60 received in an enlargement 62 of opening 56 and a reduced portion 64 of opening 56, provided with a suitable O ring, receives a portion of poppet 58 remote from its head 60. A plug 66 is provided for closing the end of the enlarged portion 62 and may be removably secured by suitable threads as shown. The heads 40, 50 and 60 are engageable with projecting lips 41, 51 and 61 for providing sealing engagement therewith for a purpose to be made clear.

The openings 36, 46 and 56 are sufficiently greater in cross-section than the stems of poppets 38, 48 and 58 so as to provide respective chambers 37, 47 and 57 therebetween facilitating communication between channels therethrough. Air is continuously admitted to enlargement 62 since communication is effected between enlargement 42 and enlargement 62 by a bipartite, oblique channel 68 which has a needle valve 69, shown in detail in Figs. 5 and 6, for controlling flow therethrough. Communication is also effected between chamber 37 and enlargement 52 by an oblique channel 70 facilitating communication between air source 22 and spring 18 when poppet 38 is unseated and between chamber 47 and ambient space through a bipartite channel 72 to exhaust air from spring 18 when poppet 48 is unseated.

Flow through channel 68 is adjustable by a needle valve 69 extending inwardly from the periphery of housing 34 to the channel 68 as shown more clearly in Figs. 5 and 6 of the drawings.

For controlling the flow of air in the respective channels, poppets 38, 48 and 58 have end portions protruding axially beyond the housing 34 for actuating engagement thereof in a manner to be described. A cam plate 74 is provided in longitudinal alignment with housing 34 and has a face 76 generally planar, with a semicircular groove 78 along a portion thereof for receiving the ends of poppets 38 and 48 in certain positions of the cam plate as shown more clearly in Fig. 3 of the drawings. Cam plate 74 is partially enclosed in a housing 80 having a disc portion 82 terminating peripherally in an axial flanged portion 84. A plurality of pins 86 tightly secured to disc portion 82 of housing 80 are loosely slidable in corresponding openings in cam plate 74 for oscillatory driving engagement between housing 80 and cam plate 74. Housing 80 is secured to arm 26 which at its end is connected to the vehicle axle 12 to provide an oscillatory motion to housing 80 and consequently cam plate 74 in response to differential spacing of the frame 10 and axle 12 in a manner to be described. Housing 80 is provided with an arcuate groove 81 of approximately 90° extent and being raised along a central portion 83 to provide a prominence thereat as shown more clearly in Fig. 4 of the drawings. The end of poppet 58 is engageable with prominence 83 to unseat head 60 from lip 61 and is receivable in other parts of groove 81 to allow sealing engagement between head 60 and lip 61.

Cam plate 74 is axially movable into engagement with poppets 38, 48 and 58 by means of air pressure applied against a piston 88 connected to cam plate 74 through a connecting rod 90 and slidable in a cylinder 92 fixedly secured adjacent housing 34 by a bracket 93. In extended position, the cam plate groove 78 in one initial position of the cam plate, is just engageable with the ends of poppets 38 and 48, allowing the respective poppet heads 40 and 50 to remain in sealing engagement against lips 41 and 51. Housing 34 and cylinder 92 are secured to frame 10 in a suitable manner and housing 80 is journalled for pivotal movement about a central flange 94 of cylinder 92.

Air is supplied to cylinder 92 from air source 22 through passages including chamber 57 which is communicable with cylinder 92 through a channel 96 in housing 34 and through a connecting conduit 98. Air under pressure admitted into cylinder 92 provides a retractive force against piston 88 urging the same to the right, as seen in Fig. 2 of the drawing, against the force of a spring 100 disposed between piston 88 and the remote end 102 of cylinder 92. End 102 is open at 104 to ambient space to prevent interfering compression of air in cylinder 92. A needle valve 105 controls the exhaust of air from within cylinder 92 through an aperture 106, and includes needle 108 having a conical surface 110 adjustably engageable with a conical seat 112, secured as by threaded engagement in a protuberance 114 of cylinder 92. The needle valves 69 and 104 are adjusted to provide a larger effective area admitting air into cylinder 92 than exhausting it therefrom, whereby air is caused to accumulate in cylinder 92 and the air pressure therein is increased sufficiently during full inward flow, to retract piston 88 against the force of spring 100. Also in the absence of flow into cylinder 92 the effective area discharging air through valve 105 is sufficiently small to provide a suitable time delay of movement of piston 88 to extended position under the influence of spring 100.

In operation of the present invention, housing 34 and cylinder 22 are secured to frame 10, the end of arm 26 is linked to axle 12 and conduits 30 and 32 are connected to valve 24 in a manner shown in Fig. 1 of the drawings. It is assumed that the vehicle to which the present invention is applied is stationary and frame 10 of the vehicle is at a predetermined, desired level or in other words that frame 10 is spaced from axle 12 as desired for optimum results as to appearance and riding qualities. Arm 26, housing 80 and cam plate are so positioned, that the ends of poppets 38, 48 and 58 engage, respectively, the two ends of groove 78 and the prominence 83 of groove 81.

Accordingly, air under pressure is admitted to cylinder 92 through conduit 30, enlargement 42, channel 68, enlargement 62, chamber 57, channel 96 and conduit 98. Valve 105 is adjusted to restrict the flow of air to a greater extent than valve 69 to effect an increase of air pressure in cylinder 92 whereby piston 88 is forced against spring 100 to retract cam plate 74 from engagement with poppets 38 and 40 or in other words, to declutch the valve. It is noted that under these circumstances heads 40 and 50 remain against respective lips 41 and 51 to prevent flow to or from air spring 18 and therefore to maintain the air pressure therewithin and that therefore the level of frame 10 also remains the same. It is further noted that with the same load, the vehicle may pass over road surface irregularities to cause oscillatory movement of arm 26 and consequently housing 80 and cam plate 74 without any change in the valve positions. While travelling over such road surface irregularities the end of poppet 58 engages portions of groove 81 removed from prominence 83 to seat head 60 against lip 61 but it is noted that this condition is only momentary and that while this condition prevails the air within cylinder 92 is not bled away or exhausted quickly enough to allow piston 88 to be extended under the influence of spring 100. Valve 105 is adjustable to control such exhaust to control the time delay in the extension of piston 88 to prevent inflation or exhaust of air spring 18 except in response to increase or decrease of load in the vehicle. A series of closely spaced road surface irregularities are also ineffective to cause engagement of cam plate 74 with ends of poppets 38 and 48 since housing 80 in oscillating between its extremes, causes prominence 83 to unseat head 60 at each such oscillation whereby the air pressure in cylinder 92 is maintained to maintain piston 88 and cam plate 74 retracted.

It is next assumed that the vehicle is stationary and that an increased load is applied to the same as may result from increasing the number of passengers therein. Arm 26, housing 80 and cam plate 74 are pivoted to a position wherein poppet 58 engages portions of groove 81 removed from prominence 83 allowing head 60 to engage lip 61. Accordingly, the supply of air to cylinder 92 is interrupted and the air pressure in cylinder 92 progressively decreases by reason of the bleeding allowed through valve 105 to a point where the force of spring 100 exceeds that of the air against piston 88 and piston 88 and cam plate 74 are extended. Under such loaded condition, cam plate 74 is pivoted so that the end of poppet 48 engages groove 78 but the end of poppet 38 engages the flat planar surface 76 of plate 74 whereby head 40 is unseated from lip 41 and air is admitted to spring 18 from air chamber 22 through conduit 30, enlargement 42, chamber 37, channel 70, enlargement 52 and conduit 32 until spring 18 raises the level of frame 10 sufficiently to pivot arm 26, housing 80 and cam plate 74 sufficiently to align the end of groove 78 in cam plate 74 with the end of poppet 38. Poppet head 40 is forced against lip 41 under pressure of air in enlargement 42 and simultaneously prominence 83 unseats head 60 to allow air to retract cam plate 74 in a manner described hereinabove.

In response to a decrease in load applied to the vehicle to which the present invention is applied and a raise in level of frame 10 from an initial predetermined position, arm 26, housing 80 and cam plate 74 are pivoted in a direction to seat head 60 against lip 61 to effect extension of piston 88 and cam plate 74 and to unseat head 50 whereby air is exhausted from spring 18 through enlargement 52, chamber 47 and channel 72 until the level of frame 10 is lowered to the point where arm 26 and housing 80 pivot to unseat head 60 from lip 61 and allow air to retract piston 88 and cam plate 84.

It is to be observed that according to the invention no corrective influence is applied to air spring 18 in response to sudden or momentary increase or decrease of spacing between the vehicle frame and axle and that prolonged increase or decrease of such spacing is effective to apply a corrective influence to the spring whereby the level of the frame is maintained at a constant average value. A sufficient, adjustable time delay is provided to render the valve responsive to average frame level changes and unresponsive to momentary changes.

As a further feature of this invention, the system of Figures 1 through 6 is modified as shown in Figure 7 to provide a closed pneumatic system. In this embodiment, an air pump 116 delivers air under pressure to a supply chamber 22' which in turn communicates with a valve 24' in a manner similar to valve 24 described hereinabove and a conduit 32', arm 26', plug 66' and protuberance 114' are disposed and function in a manner entirely similar to conduit 32, arm 26, plug 66 and protuberance 114 hereinabove described. Air in chamber 22' is used to inflate air spring 18 of the system and to actuate piston 88 thereof in a manner hereinabove described. However, in the deflation of the air spring, vents 72 and 106 rather than communicating with ambient space are in communication with the intake 118 of pump 116 through a tube 119 and an air reservoir 120. A suitable check valve 122 in one wall of reservoir 120 prevents flow of air from within reservoir 120 outwardly through an opening 124 and allows flow of air into the air reservoir in the event that atmospheric pressure exceeds pressure of air in chamber 120.

According to this modification advantage is taken of the greater than atmospheric pressure of air discharged at the outlet vent 72 to lighten the load on pump 116 by applying such air to the pump inlet. It is noted that by reason of the continual use of the same air in this closed system the collection of dust and other foreign matter likely to be entrained in the atmosphere is minimized in the system.

In the event that the air of the system be bled for any reason at all it may be replenished through the opening 124 and check valve 122 upon further operation of the system.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

We claim:

1. In a suspension system for supporting a vehicle frame in a predetermined position relative to a vehicle axle comprising an air spring disposed between said frame and axle, a source of air under pressure and a control apparatus mounted on said frame for selectively inflating or deflating said air spring to maintain a constant average level of said frame with respect to said axle, said control apparatus including a first valve actuable to provide communication between said air source and said spring, a second valve actuable to provide communication between said spring and ambient space, first cam means responsive to changes in average level of said frame with respect to said axle for actuating said valves and a further valve and second cam means responsive to changes in average level of said frame with respect to said axle for delaying actuation of either of said first or second valve and means for adjusting said time delay whereby said control is responsive to prolonged changes and is unresponsive to momentary changes in level of said frame with respect to said axle.

2. In a suspension system for supporting a vehicle frame in a predetermined position relative to a vehicle axle comprising an air spring disposed between said frame and axle, a source of air under pressure and a control apparatus mounted on said frame for selectively inflating or deflating said air spring to maintain a constant average spacing of said frame and from said axle, said control apparatus including a first valve being actuable for admitting air from said source to said air spring, a second valve being actuable for venting said air spring to atmosphere, cam means being engageable with said first valve to actuate the same in response to decrease in spacing between said frame and axle and to actuate said second valve in response to increase in spacing between said frame and axle, a cylinder having a spring biased piston slidable therein in response to air under pressure, said piston being connected to said cam means for retracting the same from engagement with said first and second valves and means including a third valve actuable to provide communication between said air source and said cylinder and further cam means responsive to increase or decrease in spacing between said frame and axle from predetermined position to actuate said third valve to retract said cam means from engagement with said first and second valves, and a bleeder vent in said cylinder for relieving the pressure in said cylinder whereby said cam means is extended to engagement with said first and second valves.

3. In a suspension system for supporting a vehicle frame in a predetermined position relative to the vehicle axle comprising an air spring between said frame and axle, a source of air under high pressure and a control apparatus mounted on said frame, means including a first valve for selectively providing communication between said air source and said air spring, means including a second valve for selectively providing communication between said air spring and ambient space, a cylinder having a spring biased piston therein, a cam plate and a connecting rod interconnecting said cam plate and said piston, said cam plate being urged into engagement with said first and second valves by the spring biasing said piston, a third valve for selectively providing communication between said air source and the interior of said cylinder between one end thereof and said piston to force said piston against said spring, a housing in oscillatable driving engagement with said cam means, and having a cammed groove in engagement with said third valve for selectively actuating the same, an adjustable vent for exhausing air from said cylinder and means connected to said housing and to said axle imparting an oscillatory motion to said housing and to said cam means in response to changes in spacing between said frame and axle whereby the quantity of said air spring maintains a constant average spacing between said frame and axle.

4. In a suspension system for supporting a vehicle frame in a predetermined position relative to the vehicle axle comprising an air spring between said frame and axle, a source of air under high pressure and a control apparatus mounted on said frame, means including a first valve for selectively providing communication between said air source and said air spring, means including a second valve for selectively providing communication between said air spring and ambient space, a cylinder having a piston therein, means urging said piston in a first direction, a cam plate having an arcuate groove in a planar face thereof rigidly connected to said piston, said cam plate being urged into engagement with said first and second valves, said cam plate being pivotal in two directions to cause said first and second valves to sequentially engage the grooved and planar surface of said cam plate, a pivotal housing in driving engagement with said cam plate and having an arcuate groove, said groove having a prominence at a central portion thereof, a third valve actuable by said prominence in predetermined position of said frame relative to said housing for providing communication between said air source and said cylinder, bleeder means for adjustably venting said cylinder to ambient space and means for pivotally positioning said housing in response to increase or decrease of spacing between said frame and axle whereby said control apparatus varies the quantity of air in said spring to maintain a constant average spacing between said axle and frame and whereby operation of said control apparatus is delayed to render the same unresponsive to momentary changes in said spacing.

5. In a suspension system for supporting a vehicle frame in a predetermined position relative to a vehicle axle comprising an air spring between said frame and axle, a source of air under high pressure and a control apparatus for controlling the quantity of air delivered to said spring from said air source, said control apparatus comprising means including a first valve actuable to provide communication between said air spring and said air source, means including a second valve actuable to provide communication between said air spring and ambient space, a cam plate being pivotal in opposite directions from a predetermined initial position to actuate respective of said first and second valves, means including a cylinder having a piston therein and connected to said cam plate, means bearing against said piston and urging said cam plate into engagement with said first and second valves, means including a third valve actuable to provide communication between said air source and said cylinder to force said piston against said urging means, means responsive to the spacing between said frame and axle and including a groove having a prominence for actuating said third valve in predetermined position of said frame relative to said axle.

6. In a suspension system for supporting a vehicle frame in a predetermined position relative to a vehicle axle comprising an air spring disposed between said frame and axle, a source of air under pressure and a control valve apparatus mounted on said frame, said valve apparatus including a cam actuable by differential spacing between said frame and axle, means engageable with said cam for inflating said spring from said air source in response to decreased spacing between said frame and axle and means for exhausting said air spring to atmosphere in response to increased spacing between said frame and axle and time delay means responsive to increase or decrease in spacing between said frame and axle to delay inflation or exhaust of said air spring, said time delay means including means retracting said cam from engagement with said means engageable therewith and means responsive to differential spacing between said frame and axle to effect engagement between said cam and means engageable therewith.

References Cited in the file of this patent

UNITED STATES PATENTS

| | | |
|---|---|---|
| 1,105,805 | Liebowitz | Aug. 4, 1914 |
| 1,371,648 | Schmidt | Mar. 15, 1921 |
| 1,544,850 | Messier | July 7, 1925 |
| 1,641,640 | Myers | Sept. 6, 1927 |